United States Patent [19]
Throckmorton

[11] Patent Number: 4,884,863
[45] Date of Patent: Dec. 5, 1989

[54] OPTICAL FIBER SPLICING ENCLOSURE FOR INSTALLATION IN PEDESTALS

[75] Inventor: Rodney A. Throckmorton, Conover, N.C.

[73] Assignee: Siecor Corporation, Hickory, N.C.

[21] Appl. No.: 319,483

[22] Filed: Mar. 6, 1989

[51] Int. Cl.⁴ .............................................. G02B 6/40
[52] U.S. Cl. .............................. 350/96.20; 350/96.22
[58] Field of Search ................ 350/96.20, 96.21, 96.22

[56] References Cited

U.S. PATENT DOCUMENTS

| | | | |
|---|---|---|---|
| 4,702,551 | 10/1987 | Coulombe | 350/96.20 |
| 4,717,231 | 1/1988 | Dewez et al. | 350/96.20 |
| 4,722,585 | 2/1988 | Boyer | 350/96.20 |
| 4,730,893 | 3/1988 | Burmeister | 350/96.22 |
| 4,752,110 | 6/1988 | Blanchet et al. | 350/96.20 |
| 4,765,709 | 8/1988 | Suillerot et al. | 350/96.20 |
| 4,792,203 | 12/1988 | Nelson et al. | 350/96.20 |
| 4,818,054 | 4/1989 | George et al. | 350/96.20 |
| 4,820,007 | 4/1989 | Ross et al. | 350/96.20 |
| 4,824,196 | 4/1989 | Bylander | 350/96.20 |
| 4,840,449 | 6/1989 | Ghandeharizadeh | 350/96.20 |

FOREIGN PATENT DOCUMENTS 61-55607  3/1986  Japan ........................... 350/96.20 X

OTHER PUBLICATIONS

"Fiber to the Home Media System" ©1988 AT&T.

Primary Examiner—William L. Sikes
Assistant Examiner—Brian M. Healy
Attorney, Agent, or Firm—J. David Abernethy

[57] ABSTRACT

Described is a fiber optic splicing enclosure to be installed within existing copper distribution pedestals. Elastic material holds the splicing enclosure in an essentially stationary position during limited movement of the ground surface due to frost heave or the like. Additional diagonally placed elastic straps secure the optical waveguides in a desired position.

4 Claims, 2 Drawing Sheets

OPTICAL FIBER SPLICING ENCLOSURE FOR INSTALLATION IN PEDESTALS

BACKGROUND OF THE INVENTION

1. Field of the Invention

The field of the invention is splice enclosures for optical waveguides.

2. Background of the Invention

Sheet metal pedestals are presently installed in various locations for the connection of copper communication cables. It would promote efficiency to be able to place optical splices in these pedestals. Unfortunately, the pedestals are usually constructed of sheet metal, which does not offer the environmental protection currently required for optical waveguide (optical fiber) splices. The existing copper pedestals in areas such as Wisconsin are also subject to frost heave. Frost heave, associated with the freezing and melting of water in the surface of the ground, can cause the existing pedestals to appreciably rise or fall with respect to the underlying stable ground surface. Copper cables can still be connected to each other in such pedestals by the practice of putting a few extra bends in the copper cables. These bends can accommodate the motion associated with frost heave. However, optical fibers are not malleable. In fact, increased power losses or even cable failure results when optical fibers are bent beyond a certain point, known as their minimum bend radius. Since the optical fiber cables must be buried below the frost layer in current installation practices, most of the fiber optic cable would not move during frost heave. However, the end of the cable would have to come up through the frost layer into the pedestal if the pedestal were to be used for the splicing of optical fiber cables. Therefore, frost heave would subject the optical waveguide fiber cables to tensile, compression, or bending forces when the pedestal itself rises or falls during frost heave. These forces would therefore subject the optical fiber cables to increased power losses or even failure. Such interruptions in service are unacceptable to the telephone companies or other users of optical fiber cable.

BRIEF SUMMARY OF THE INVENTION

To solve the problem of exposure to general environmental conditions, the invention calls for an environmentally self-contained optical waveguide splice enclosure which can be contained within the existing copper pedestal.

To allow for the problem of frost heave, an elastic material mounted to the pedestal holds the optical waveguide splice enclosure in an essentially stationary position during limited movement of the ground surface due to frost heave or the like. The optical waveguide splice enclosure can be suspended within the pedestal by the elastic material or it may be supported on the elastic material. The supporting elastic material may be springs or the like. The suspending elastic material may be silicone rubber O-ring material, springs, or the like. The object of the invention is that frost heave or other minor earth surface movement will cause the deformation of the elastic material, but not deform the optical fibers or the optical fiber splices.

DETAILED DESCRIPTION OF THE PREFERRED EMBODIMENTS

Figure 1:
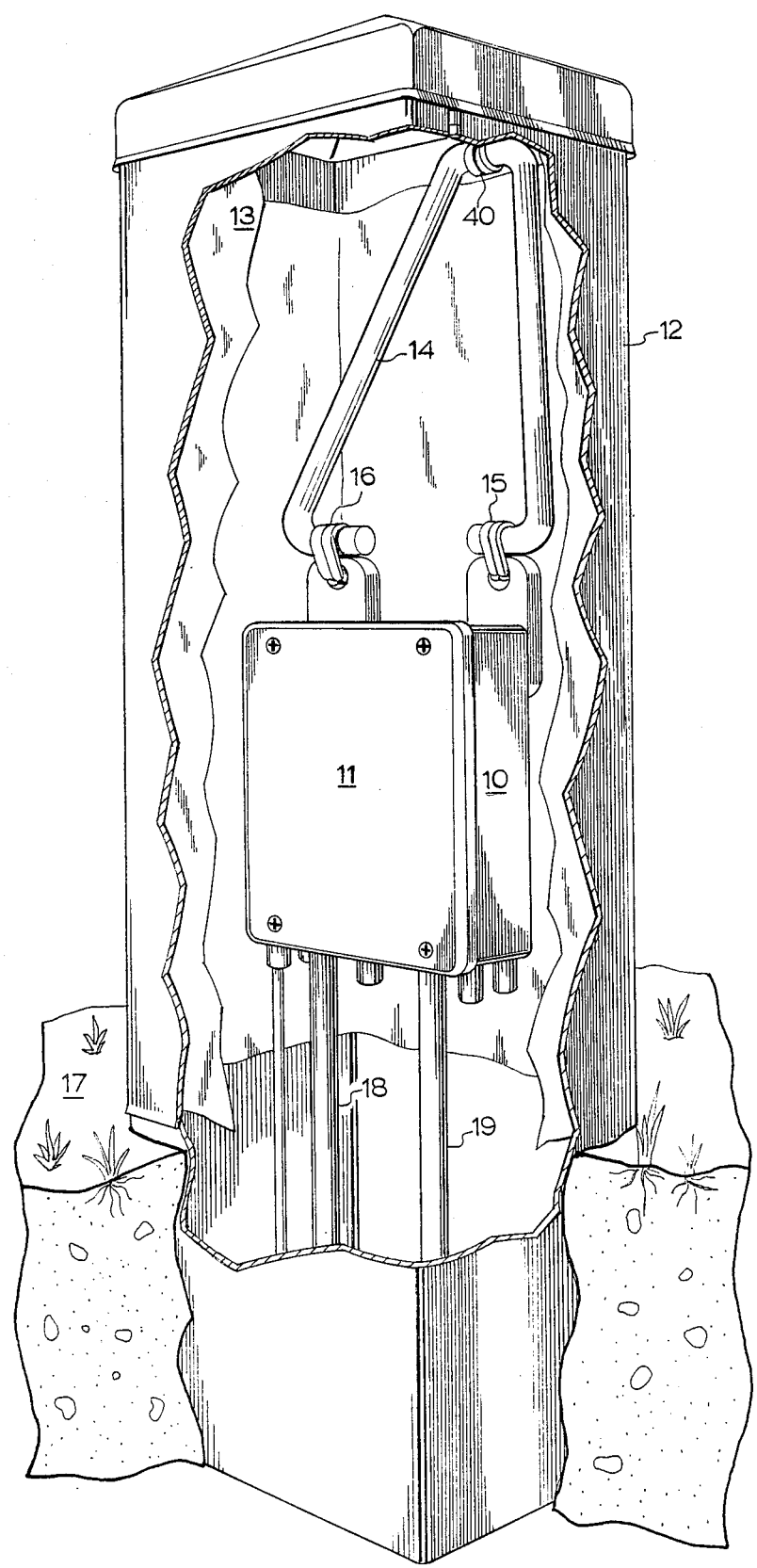
FIG. 1 is a perspective view of an outdoor pedestal cut away to disclose the splicing enclosure.

FIG. 1 discloses a prior art pedestal 12 set in the earth 17. Pedestal 12 probably housed copper cable connections when it was first installed. The walls of pedestal 12 are cut away to show splicing enclosure 10 covered by lid 11. Enclosure 10 and lid 11 form an environmentally self-contained unit, with particular emphasis on resisting moisture ingress. Plastic material 13 is also draped inside enclosure 12 to further hinder the entrance of moisture or ultraviolet rays from the environment. Buried optical fiber cables 18, 19 proceed upward into splicing enclosure 10.

In order to keep splicing enclosure 10 and optical fiber cables 18, 19 in an essentially stationary position during limited movement of the ground surface 17 due to frost heave or the like, splicing enclosure 10 hangs from silicone rubber o-ring material 14. Silicone rubber 14 is fastened to the side of pedestal 12 by means of straps 40 mounted to pedestal 12, and splicing enclosure 10 is mounted to silicone rubber 14 by means of tie wraps 15, 16.

Figure 2:
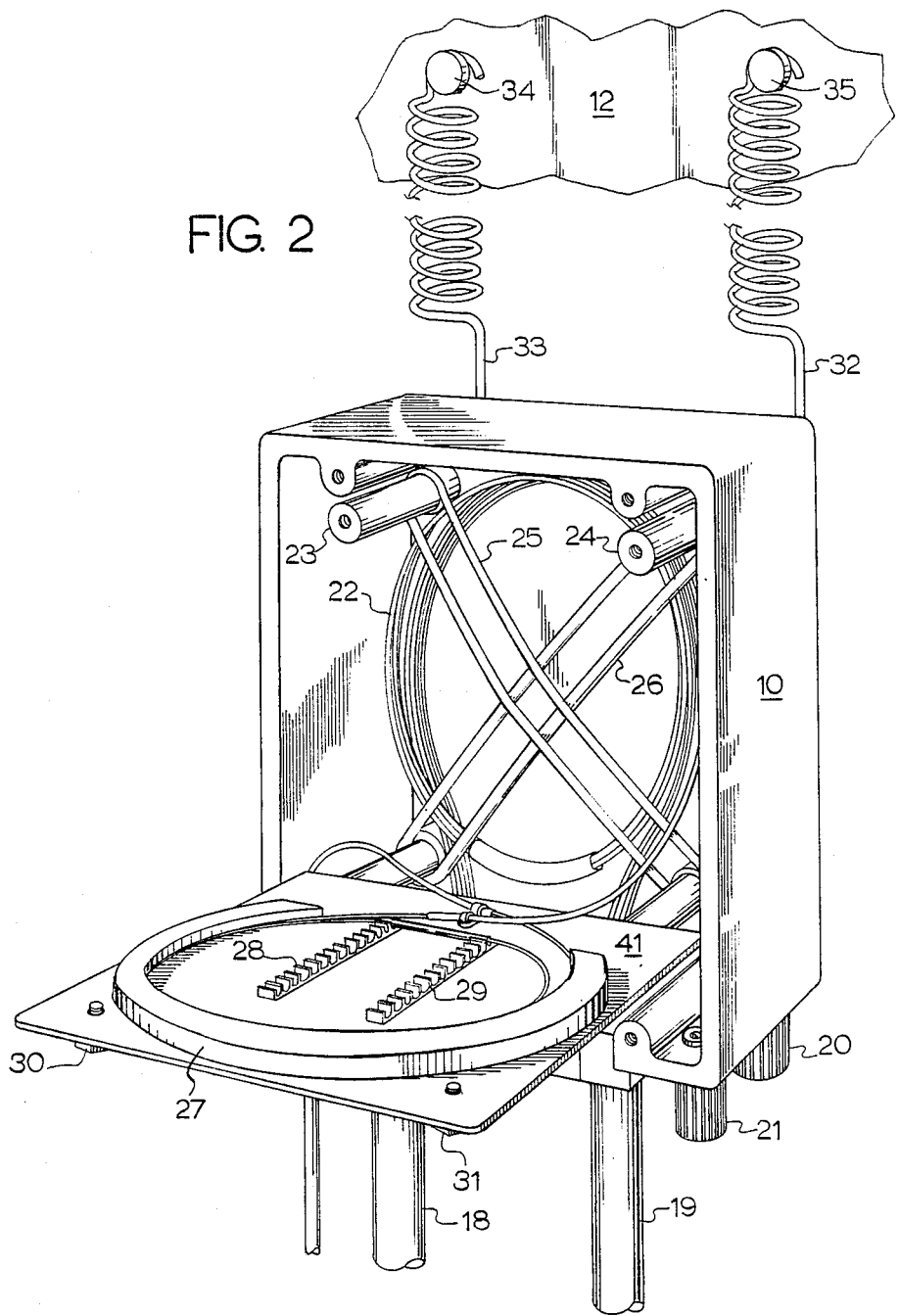
FIG. 2 is a more detailed view of the splicing enclosure with its lid being opened.

FIG. 2 shows a second means of suspending the splicing enclosure from pedestal 12. Springs 32, 33 hang from bolts 34, 35 mounted to the side of pedestal 12. Although elastic material placed underneath the splicing enclosure would also solve the frost heave problem, such placement is less desirable because the cables generally enter from the underside of the splicing enclosure; therefore, a suspending elastic material is currently preferred.

Cable such as 18, 19 may enter the splicing enclosure 10 through liquid tight connectors 20, 21.

The unfastening of bolts of 30, 31 allows lid 41 to be moved to its open horizontal position as shown in FIG. 2. Optical fiber buffer tubes 22 are circled inside the enclosure 10 as shown and are held in place by elastic straps 25, 26 which are mounted diagonally from posts such as 23, 24 found in the corners of the splicing enclosure. Posts 23, 24 also have threaded openings to conveniently serve as mounts for bolts 30, 31. Lid 41 further has circular guide 27 to assist the craftsperson in maintaining the required minimum bend radius of the buffer tubes and splicing units 28, 29, which may be any of a variety of prior art splicing tray designs.

We claim:

1. Apparatus comprising:
   (a) an object mounted to the earth;
   (b) an optical waveguide splice enclosure; and
   (c) elastic material mounted to the object, said elastic material holding the optical waveguide splice enclosure in an essentially stationary position during limited movement of the ground surface due to frost heave or the like.

2. Apparatus as recited in claim 1, wherein the optical waveguide splice enclosure hangs from the elastic material.

3. An optical waveguide splice enclosure, comprising:
   (a) a rectangular base;
   (b) a post mounted on each corner of the rectangular base; and,
   (c) two optical fiber retaining elastic straps, each elastic strap placed around diagonally opposing posts.

4. An optical waveguide splice enclosure as recited in claim 3, further comprising threaded openings in at least two of the posts to enable fastening of a lid to the base.

* * * * *